United States Patent
Rosaria (10) Patent No.: US 7,493,522 B2
(45) Date of Patent: Feb. 17, 2009

(54) MODEL INDEPENDENT INPUT REDUCTION

(75) Inventor: Steven M. Rosaria, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 425 days.

(21) Appl. No.: 11/275,812

(22) Filed: Jan. 30, 2006

(65) Prior Publication Data

US 2007/0240113 A1    Oct. 11, 2007

(51) Int. Cl.
*G06F 11/00* (2006.01)
(52) U.S. Cl. .......................... 714/38; 717/124
(58) Field of Classification Search .............. 714/38, 714/37; 717/124, 125, 126
See application file for complete search history.

(56) References Cited

U.S. PATENT DOCUMENTS

| | | | |
|---|---|---|---|
| 5,794,046 A | | 8/1998 | Meier et al. |
| 6,002,869 A | * | 12/1999 | Hinckley ..................... 717/124 |
| 6,029,002 A | | 2/2000 | Afifi et al. |
| 6,173,440 B1 | | 1/2001 | Darty |
| 6,513,154 B1 | | 1/2003 | Porterfield |
| 6,865,731 B2 | * | 3/2005 | Davia et al. .................. 717/127 |
| 7,272,752 B2 | * | 9/2007 | Farchi et al. .................. 714/38 |
| 2003/0046613 A1 | | 3/2003 | Farchi et al. |
| 2003/0208351 A1 | * | 11/2003 | Hartman et al. .............. 703/22 |
| 2004/0194063 A1 | | 9/2004 | Pereira |
| 2004/0225919 A1 | | 11/2004 | Reissman et al. |
| 2005/0256665 A1 | * | 11/2005 | Hartmann et al. ........... 702/121 |
| 2006/0005170 A1 | | 1/2006 | Rosaria et al. |

OTHER PUBLICATIONS

I. K. El-Far et al., "Model-Based Software Testing", Encyclopedia on Software Engineering (edited by J.J. Marciniak), Wiley, 2001.
"Software Acquisition Gold Practice Model-Based Testing", DACS Gold Practice Document Series, Model-Based Testing, GP-34 V 1.1, Last Updated: Oct. 20, 2003.
Reactive Systems, Inc., "Model-Based Testing and Validation of Control Software with Reactics", Reactive Systems Report # 2003-1, Nov. 2003.
Cem Kaner, "The Ongoing Revolution in Software Testing", Florida Institute of Technology, Software Testing and Performance Conference, Baltimore, Dec. 8, 2004.
J.J.P. Tsai et al., "A Noninterference Monitoring and Replay Mechanism for Real-Time Software Testing Debugging", IEEE Transactions on Software Engineering, 1990, pp. 897-916, vol. 16, No. 8.
Seapine Software, "Seapine QA Wizard", http://www.seapine.com/qawizard.html, retrieved on Jan. 10, 2006.

* cited by examiner

*Primary Examiner*—Dieu-Minh Le (57) ABSTRACT

A software reduction component may be provided with a software interface. The software interface may define a test case load method also define a model load method. The reduction component has logic for reducing test cases loaded via implementations of the method definitions. An implementation of the software interface can be provided. The implementation has an implementation of the defined test case load method, which can parse test cases in a first format and can build data structures corresponding to the test cases that are accessible by the software reduction component. The implementation can also have an implementation of the defined model load method, which can parse descriptions of models of respective programs and generate therefrom model data structures that model behavior of the respective programs.

12 Claims, 7 Drawing Sheets

MODEL INDEPENDENT INPUT REDUCTION

BACKGROUND

Model-based testing is a technique used to test or debug software. With model-based testing, a description, or model, is created that captures the behavior of a software or system being tested. From this description, any number of test cases can be automatically generated and executed on the software to verify the software's quality or behavior. However, when a defect or undesirable condition is found in a test case, it can be difficult for software testers to isolate and diagnose the problem. Only a few unknown execution steps may be responsible for causing a condition of interest, such as an error condition, a fault, an unexpected result, etc. Those few steps in the test case that are essential to exposing the program's condition may be scattered among thousands of extraneous steps. Identifying them can be difficult, yet isolation and diagnosis of causes of the condition is easier when extraneous execution steps are eliminated.

SUMMARY

The following summary is included only to introduce some concepts discussed in the Detailed Description below. This summary is not comprehensive and is not intended to delineate the scope of the claimed subject matter, which is set forth by the claims presented at the end.

A software reduction component may be provided with a software interface. The software interface may define a test case load method and may also define a model load method. The reduction component has logic for reducing test cases loaded via implementations of the method definitions. An implementation of the software interface can be provided. The implementation has an implementation of the defined test case load method, which can parse test cases in a first format and can build data structures corresponding to the test cases that are accessible by the software reduction component. The implementation can also have an implementation of the defined model load method, which can parse descriptions of models of respective programs and generate therefrom model data structures that model behavior of the respective programs.

Many of the attendant features will be more readily appreciated by referring to the following detailed description considered in connection with the accompanying drawings.

DESCRIPTION OF THE DRAWINGS

Like reference numerals are used to designate like parts in the accompanying Drawings.

DETAILED DESCRIPTION

The following description relates to model-based software testing. The description explains how model-based software testing is used to reduce test cases or input sequences. This is followed by a discussion of how a test case reducer can be constructed to reduce test cases independent of the formats or origins of program models, program test cases or input sequences, log files, program drivers, or other files often used for model-based testing and test case reduction.

Model-based software testing generally involves modeling a system and using the model to automatically test the system. Specifically, model-based software testing may involve building a model of a program or system to be tested, where the model reflects the behavior or the various states and actions of the program or system. Although models may take different forms, finite state machines, state charts, decision tables, and grammars are typically used to model a system. Embodiments discussed below use graphs or finite state machines, however other forms of models may be used. Expected inputs are also considered part of a model. Sequences of test inputs may be applied to the model and outputs expected from the model may be compared to real world outputs.

Figure 1:
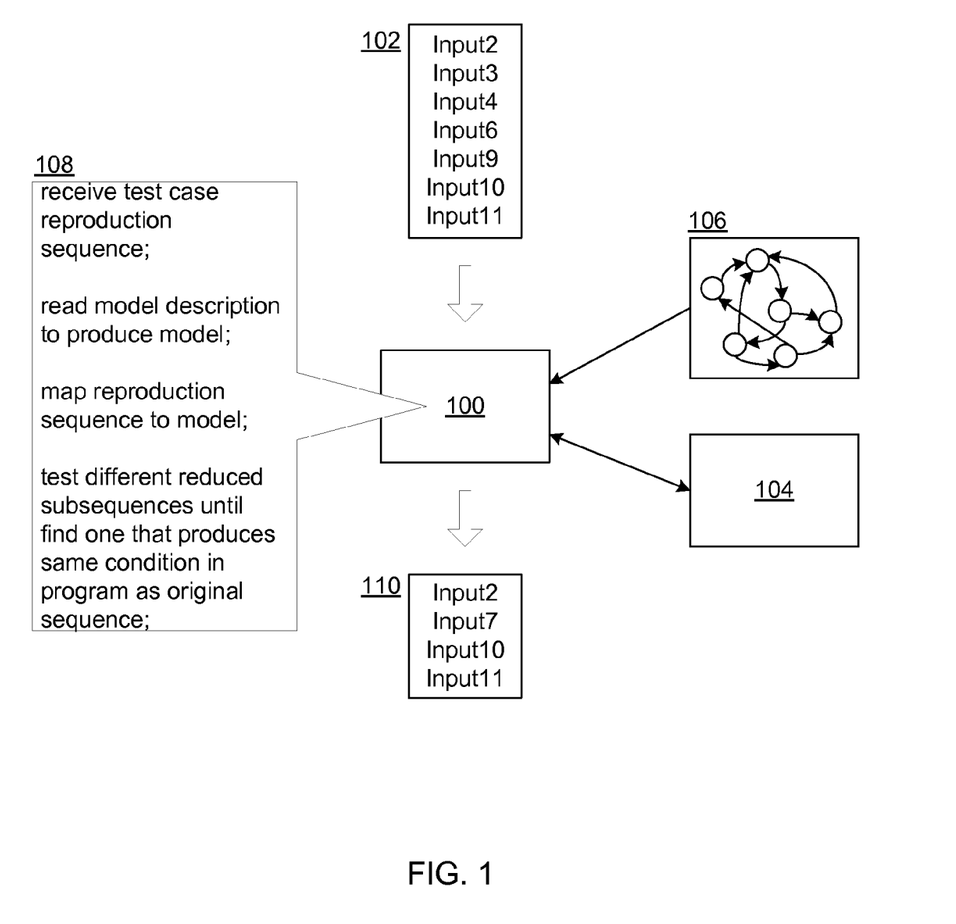
FIG. 1 shows a reducer for reducing a model-based test case.

FIG. 1 shows a reducer 1 00 for reducing a model-based test case 102. The test case 102 is a sequence of inputs, events, actions, etc. that may have been composed by a person or may have actually transpired via a program 104. The reducer 100 uses a model 106 of the program 104 as discussed further below. As mentioned in the Background, with model-based testing it may be desirable to effectively reduce the test case 102 by reducing the magnitude of the test case 102. The reducer 100 performs or controls a process 108 of reducing the reproduction sequence or test case 102 to a reduced test case 110. The reducer 100 is a software component and may take any form such as a standalone program, a component of a larger test suite, etc. The reducer 100 uses the system or program 104 (indirectly via a driver, as discussed with reference to FIG. 2) and the model 106 thereof to test behavior of the program 108 as it processes the input of the test case 102. More specifically, as seen in process 104, the test case 102 is received by the reducer 100. The reducer 100 may instantiate the model 106 by reading a model description (e.g., XML file, flat file, etc., discussed later) and translating the model description into a working model; the model 106. The working model 106 is preferably a functional state machine or graph, capable of changing state according to a series of applied inputs (e.g., test case 102) that correspond to state transitions, as will be discussed in more detail below with reference to FIGS. 3-5. The use of the system or program 104 will be discussed with reference to FIG. 2.

Turning to process 104, the reproduction sequence or test case 102 is mapped to the working model 106. For example, the inputs listed in the test case may be compared to the working model 106 to verify that it describes a valid path through the model 106. The reducer 100 then reduces the reproduction sequence or test case 102 by testing different reduced subsequences until one is found that reduces the test case 102 (reduces the number of inputs) and also reproduces a same condition in the program 104 as the original test case 102. It should be born in mind that a "same" condition is used somewhat loosely herein. In most cases it will be impossible to exactly reproduce a same program state in a reduced sequence, i.e., the same variable values, stack and heap values, etc. A "same" condition can mean that both the original sequence and the reduced sequence produce an error state or some other general condition (e.g., suspended program, infinite loop, memory overflow, etc.). Such states of which may have varying degrees of "sameness". Details of reducing a test case will be discussed with reference to FIGS. 3-5.

Mapping a test case to a working model involves identifying the path of the original failure sequence onto the full state space of the program model. By analogy, consider a street map of a city as being similar to a full state space such as model 106). Instructions on how to get from point A to point B in the city are similar to an original failure sequence. The mapping process would be similar to taking a marker and physically tracing out the directions to get to point B on the street map. Given this initial information, faster alternatives can be found by looking at the street map (model). Thus, the mapping can be beneficial because it allows the reducer to know what path it is trying to minimize; when the reducer knows the initial failure path through the entire state space it can try to find a shorter failure sequence. The actual mapping is preferably done by a separate data structure that tracks what nodes and paths in the state space are part of the original sequence. In other words, mapping correlates the state space and the reproduction sequence or test case 102.

Figure 2:
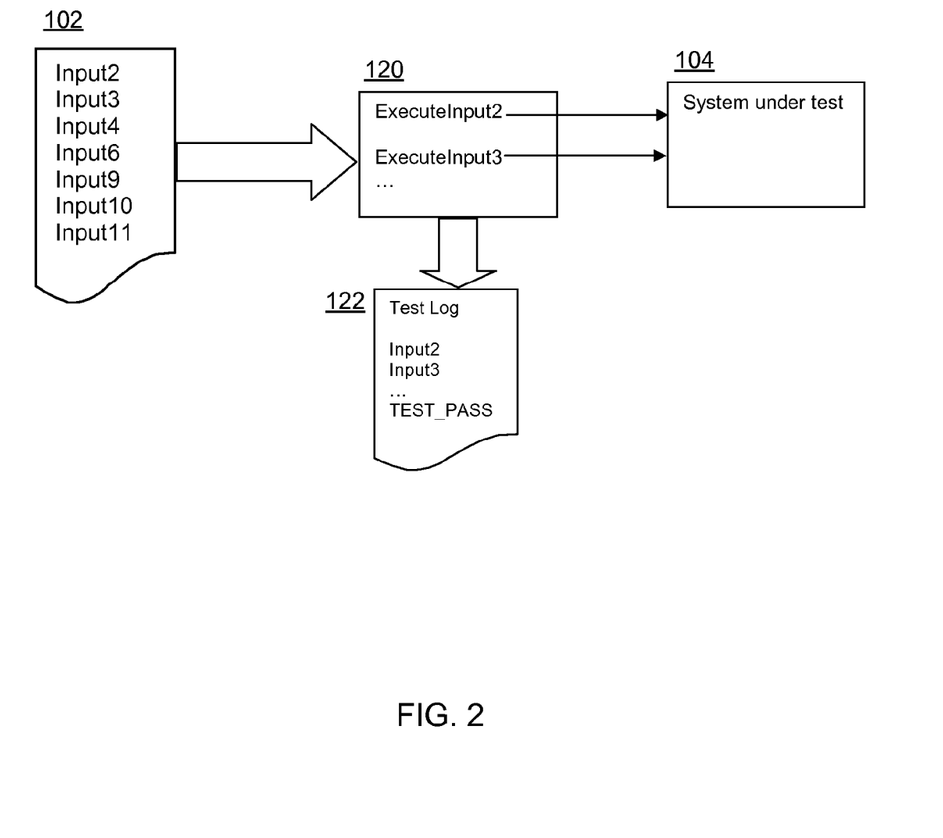
FIG. 2 shows how a software driver can be used to allow a test input sequence, such as test case, to be tested against the system or program.

FIG. 2 shows how a software driver 120 can be used to allow a test input sequence, such as test case 102, to be tested against the system or program 104. A common operation in model-based testing is to test the effect of an input sequence or test scenario. That is, to determine whether a particular sequence of inputs produces a certain condition in a program, for example, an error condition or some other condition. This can be accomplished using a program driver 120. The driver 120 knows how to apply the actions or inputs in a test sequence to the program 104 under test. The driver 120 takes an input described in the test case 102 and drives the program 104 accordingly. For example, if input 3 (in test case 102) is a "mouse click on button 1", then the driver 120 might pass an appropriate mouse-click window event to the program 104. If the driver 120 receives input 9 and input 9 is, for example, an "open document" command, then the driver 120 would cause the program 104 to execute accordingly. There is no limit to the nature of the inputs or actions that a driver can drive the program 104 to perform. In sum, the program driver 120 simulates inputs to the program 104 under test thereby facilitating manipulation and execution of a test sequence such as test case 102. Furthermore, the program driver 120 may progressively save to a test log 122 various results of driving the program 104. The test log 122 can be used by a tester to evaluate the effect of the test case 102 or it can be used by the reducer 100 to automatically spot errors or other conditions of the program 104.

Figure 3:
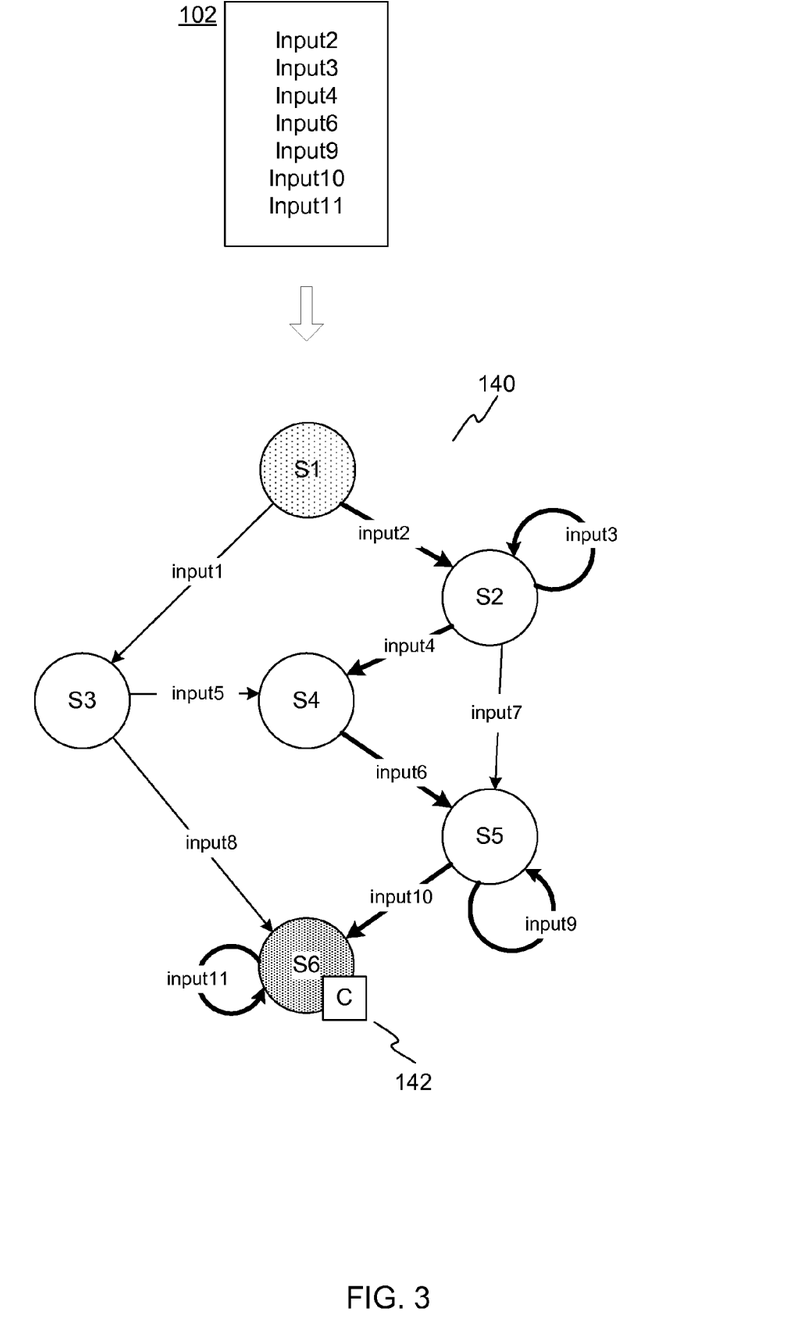
FIG. 3 shows how an example test case maps to a working model of the example program under test.

FIG. 3 shows how example test case 102 maps to a working model 140 of the example program 104 under test. The working model 140 is a finite state machine, for example, produced from a model description such as a flat file or XML file that describes the various states and transitions of the model. For example, the model description can be a file with lines that each describes a state, a program input to transition into the state, and a program input to transition out of the state. Techniques for building a state machine from this type of information are well known and explanations thereof may be readily found elsewhere. As shown by the thick transition lines in FIG. 3, the test case 102 describes a path through the working model 140. The path corresponds to the state changes that would occur in the program 104 if it were processing the inputs listed in the test case 102. It may be known that at the final state (S6) the test case 102 leads to a certain condition "C" 142 in the modeled program; program 104.

A plausible test scenario may be that a tester is provided with an execution log (e.g., a trace file) of program 104. The execution log may be used to derive the sequence of inputs that make up test case 102. Furthermore, the execution log might have some indicia that, after responding to the traced sequence of actual inputs, the program may end up in a state having a condition "C", which might be an error condition or any other condition of interest. If the test case 102 mirrors the execution log, and if the test case 102 is used to drive the program 104 via the program driver 120, then in theory the program 104 should end up in the same condition "C" 142. In other words, if non-simulated inputs "input2", "input3", . . . "input11" led to condition "C" in the program 104, then simulation of those same inputs by feeding the test case 102 to the program driver 120 should also cause the program 104 to end up in a state analogous to state S6, at which state it should have condition "C".

As mentioned earlier, it may be desirable to reduce the magnitude or number of inputs in the test case 102 (see reduced test case 110 in FIG. 1). For example, there might be hundreds of inputs and state changes in a test case, and yet only a few may give rise to the condition of interest. However, these few are usually not known. Elimination of superfluous inputs and state changes can ease the task of isolating those that help bring about the condition of interest. To this end, the reducer 100 may apply a reduction algorithm to the test case 102. In one embodiment, the reduction algorithm may involve: picking two random points or states along the test case path; computing the shortest path between those states through the working model 140 using any minimal-path-finding algorithm such as Dijkstra's algorithm; applying the test case 102 with the minimized path between the two points to the program driver 120 to determine if it reproduces the condition "C" 142 in program 104. This may be repeated until an iteration limit or a reduction threshold is reached, resulting in reduced test case 110. The reduction algorithm reduces the test case 102 without eliminating inputs therein that help to bring about the condition of interest; condition "C" 142. The inputs that contribute to the condition of interest are preserved because if a reduced version of the test case 102 (one with a subpath replaced with a smaller subpath) does not reproduce the condition then it is rejected. Usually, only inputs that don't affect the condition will be eliminated.

Figure 4:
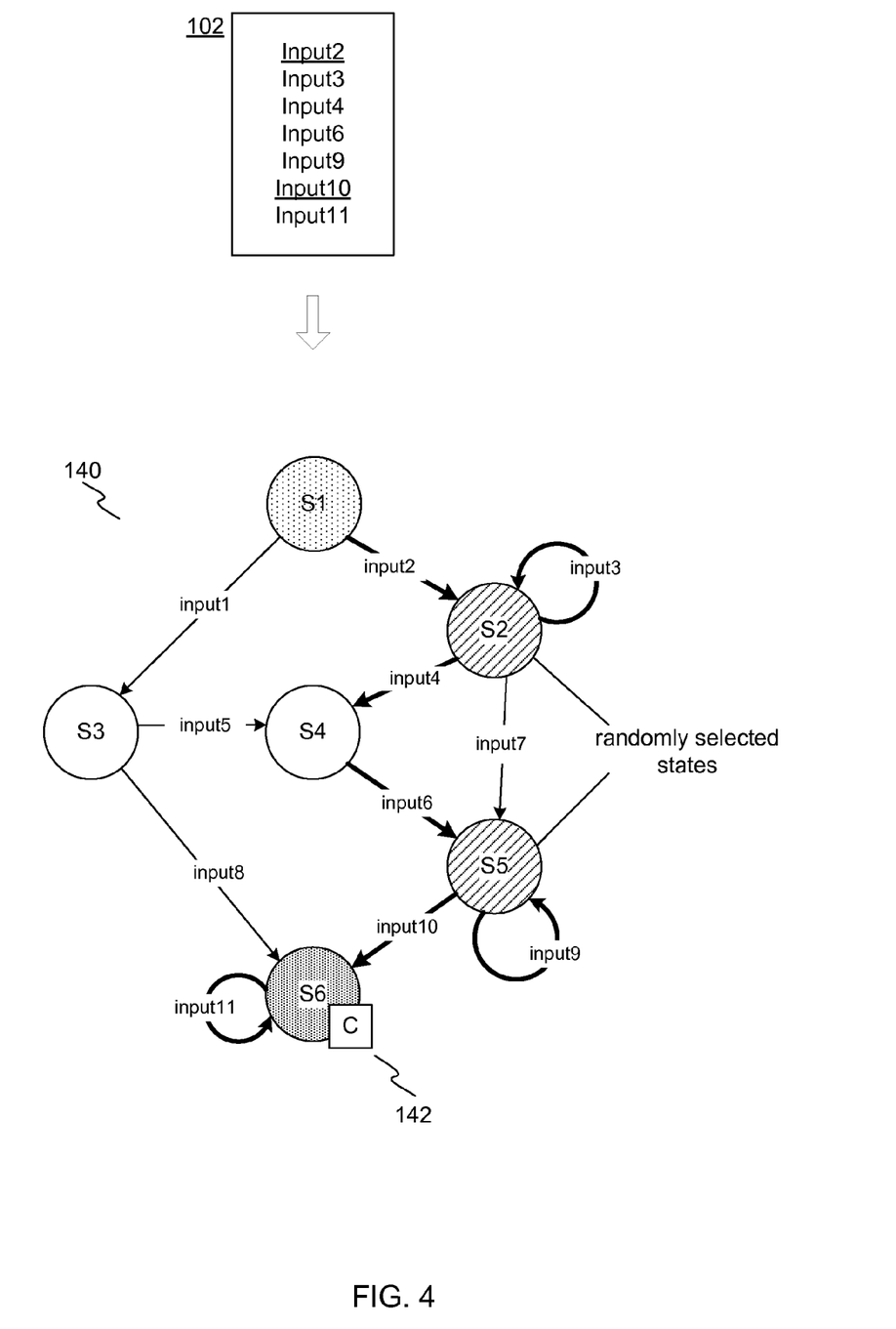
FIGS. 4 and 5 show an example of path reduction.
Figure 5:
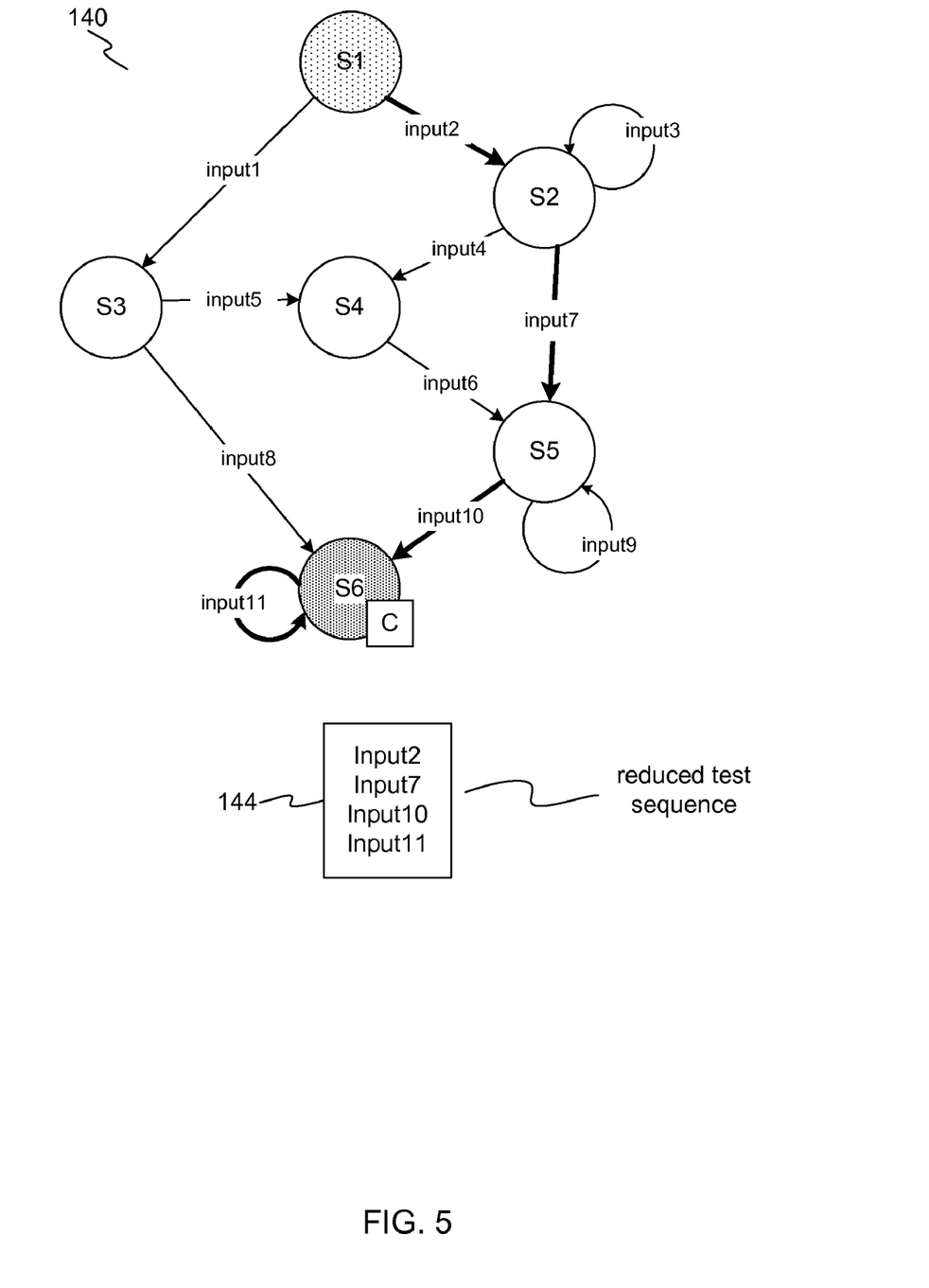

FIGS. 4 and 5 show an example of path reduction. Referring to FIG. 4, the path reduction algorithm begins by randomly selecting two states in the original test case 102. In this example, S2 and S5 are selected. The minimal-path-finding algorithm is applied to states S2 and S5 to find the minimal path between them. In this case, the minimal path is simply "input 7". The original subpath "input 3", "input 4", "input 6", "input 9", is replaced with the minimal path "input 7", resulting in temporary test case "input 2", "input 7", "input 10", "input 11", which is shown in FIG. 5. At this point, the test case is considered "temporary" because it has not been determined whether it is valid or not. The path reduction algorithm feeds the temporary test case to the program driver 120 to determine whether the temporary sequence is valid, that is, whether it produces condition "C" 142 in the system or program 104. If condition "C" 142 arises, then the test case 102 is reduced accordingly, producing reduced test case 144. This process might be repeated many times for a large test case.

Figure 6:
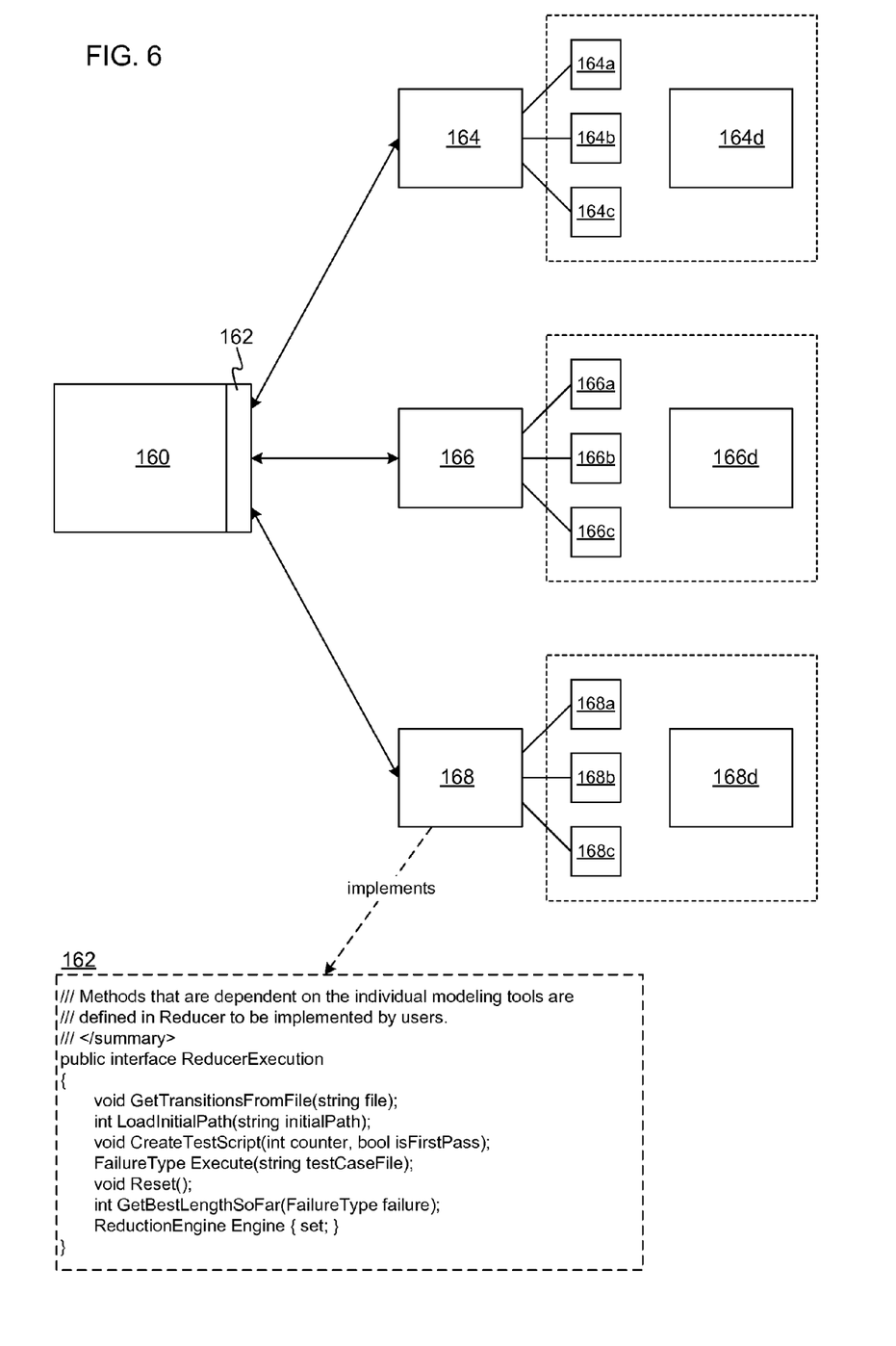
FIG. 6 shows a test case reduction engine configured with an abstraction interface.

FIG. 6 shows a test case reduction engine 160 configured with an abstraction interface 162. The reduction engine 160 implements a path reduction algorithm similar in function to the one discussed above. However, the reduction functionality is separated by the abstraction interface 162. The abstraction interface 162 can be implemented by any number of implementations, such as example implementations 164, 166, and 168. A number of off-the-shelf testing tools are available for modeling and testing software. Each tool will often have its own format for describing a model of a program under test. Each tool will often also have its own format for log files, for interfacing with test drivers, and so on. By providing the abstraction interface 162, it is possible for a same test case reducer or test case reduction engine 160 to be used to reduce test cases that are specific to any of the various modeling tools that are or may become available.

Each of the various implementations 164, 166, 168 of the interface 162 may use various files and software specific to a different modeling tool or model format. For example, implementations 164, 166, 168 may have model descriptions 164a, 166a, 168a, respectively, that have formats specific to respective different modeling tools. Implementations 164, 166, 168 may also have drivers 164b, 166b, 168b, respectively, and programs 164c, 166c, 168c, respectively, that are being tested. Finally, implementations 164, 166, 168 will have test cases 164d, 166d, 168d, respectively, with different formats.

The interface 162 can be implemented in a number of ways. However, the example interface 162 shown in FIG. 6 specifies a method (GetTransitionsFromFile) for reading a description of a model into a generic working model not specific to any modeling tool. Any of the implementations 164, 166, 168 would include a custom implementation of this method to load a model into the form of a graph or state machine. An implementation typically involves reading a description of a transition (action, input) and the nodes transitioned to and from, adding that information to a graph node, and adding that node to the accumulating graph of the program model.

The interface 162 also specifies a method (LoadInitialPath) that is to read in the initial test sequence or test case that led to the failure or condition of interest and maps the test case onto the graph model that was created by invoking the GetTransitionsFromFile method. Because this is an interface method, each implementation 164, 166, 168, etc. can handle the details of their respective modeling tools.

The interface 162 also specifies a method to create a test script (CreateTestScript). CreateTestScript is called when a new proposed test sequence is to be executed by the implementation's test driver (e.g., 164b, 166b, 168b). The transitions of the graph model are traversed and the information that was encoded in GetTransitionsFromFile is decoded and written into the same format as the test cases for whichever modeling tool format is being used.

Other maintenance methods may be provided. For example, a Reset method may be implemented to terminate the test driver and any child processes it may have spawned. A GetBestLengthSoFar method may be provided to parse the trace log of the test driver and count the number of steps that it took for a failure to occur.

Figure 7:
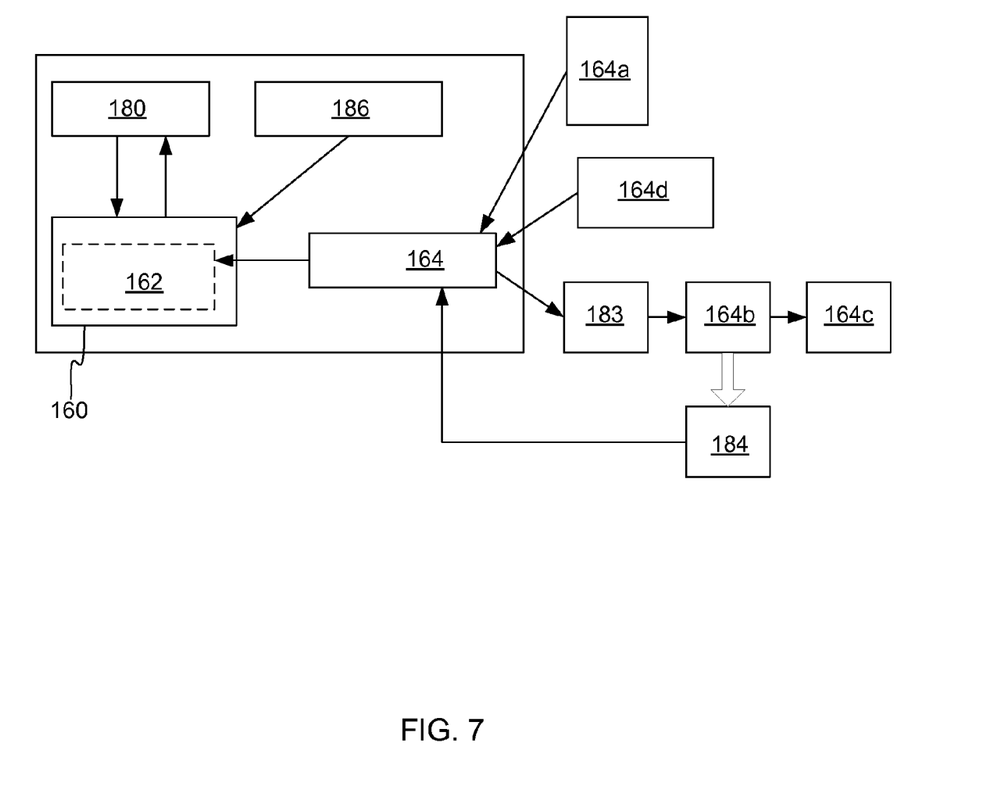
FIG. 7 shows how the reduction engine is related to the various pieces associated with an implementation of the interface.

FIG. 7 shows how the reduction engine 160 is related to the various pieces associated with an implementation of the interface 162. FIG. 7 also shows a client 180 that may be included to set up properties in the reduction engine 160 and initiate the overall path minimization process. The client 180 starts the process of loading the model 164a, mapping the initial test case 164d onto the model 164a, iteratively computing a shorter sequence 183 by invoking an Execute method, and handing this shorter sequence 183 to the test driver 164b to be tried on the system under test. Since different modeling tools have different formats for storing models, test cases, and log information, these tasks are done in implementations of the interface 162, e.g., implementation 166. Thus, each implementation of the interface 162 can handle the details specific to a particular modeling tool. In addition, the methods to execute and reset a test driver are also part of the interface. The Execute method causes the implementation 164 to launch the test driver 164b as a separate process and then monitors the health of this process. When the Execute method of the implementation 164 detects a test failure, it notifies the reduction engine 160. The failure type can be either "none" (no system failure was detected), "crash" (the system 164c under test or the test driver 164b experienced a catastrophic failure), "hang" (the system 164c under test failed to respond within a certain time and is assumed to be hung) or "test failure" (the test driver 164b finished executing a candidate test case or shorter sequence 183 but an error was reported). The reduction engine 160 in turn raises an event (e.g., "OnFoundBug") to which the client 180 can subscribe. The client 180 can display statistics, play a sound, etc. in the event handler. In case of a failure, the implementation 164 parses a log 184 from the test driver 164b and counts the number of steps that led to the failure. This is then reported to reduction engine 160 so that the engine 160 knows what the length of the next iteration's sequence should be.

Regarding the process of test case reduction, the interface methods mentioned above are generally called in the following order: GetTransitionsFromFile is called to load the full state space; (1) LoadInitialPath is called to load the initial test sequence and map the test sequence onto the state transition diagram obtained via GetTransitionsFromFile; (2) CreateTestScript is then invoked and the initial test sequence is reconstructed; (3) the Execute method is invoked to execute the test driver with the reconstructed initial test sequence, this also monitors the execution of the test driver and returns an indication of whether the sequence resulted in a crash, a hang, a test failure, or lack of any failure; (4) the Reset method is invoked if so indicated by the return from the Execute method; (5) BestLengthSoFar is invoked to count the number of steps that it took for failure to occur. The reduction engine 160 repeats steps (3)-(5) until the test path has been sufficiently reduced or some limit has been reached.

While not part of interface 162, a configuration file 186 may be used to provide various pieces of information that are specific to the modeling tool to which a model, test case, driver, etc. correspond. Such a configuration file 186 may contain instructions on how to invoke the test driver with the initial test sequence. The configuration file 186 may describe command-line arguments that an implementation can use to launch a test run. The configuration file 186 may also contain information as to what denotes a test failure, e.g., special markers in the test driver log 184. The configuration file may need to be tailored for the formatting details of the model-based testing tool to which the configuration file's implementation corresponds.

It will be appreciated from the description above that a path reducer can be accessed via an interface, thus allowing the details handling test components to be abstracted away from test case reduction. A same test reducer can be used with different files of any format. It is even possible to reduce a test case using components or files that are specific to different test tools. For example, a model description could be formatted for a first test tool and a log file could be formatted in accordance with the requirements of a second test tool.

In conclusion, those skilled in the art will realize that storage devices used to store program instructions for implementing embodiments described above can be distributed across a network. For example a remote computer may store an example of a process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art, all or a portion of the software instructions may be carried out by a dedicated circuit, such as a DSP, programmable logic array, or the like.

All of the embodiments and features discussed above can be realized in the form of information stored in volatile or non-volatile computer or device readable medium. This is deemed to include at least media such as CD-ROM, magnetic media, flash ROM, etc., storing machine executable instructions, or source code, or any other information that can be used to enable or configure computing devices to perform the various embodiments discussed above. This is also deemed to include at least volatile memory such as RAM storing information such as CPU instructions during execution of a program carrying out an embodiment.

The invention claimed is:

1. One or more computer storage media storing computer executable instructions, wherein execution of the computer executable instructions causes a computer to perform a process that implements an interface, the process comprising:
   at an implementation of the interface:
      generating a working model of a program by reading a model description with a first format, the model description describing transitions between states that correspond to transitions between states of the program;
      loading a test path and mapping it to the working model;
   at a reduction engine having the interface:
      reducing the test path;
      causing the program to execute according to the reduced test path; and
      determining whether the execution of the reduced test path reproduced a same program condition as the original unreduced test path;
   at another implementation of the interface:
      generating another working model of another program by reading another model description with a second format, the other model description describing transitions between states that correspond to transitions between states of the other program;
      loading another test path and mapping it to the other working model; and
   at the reduction engine having the interface:
      reducing the other test path;
      causing the other program to execute according to the reduced other test path; and
      determining whether the execution of the other reduced test path reproduced a same program condition as the other original unreduced test path.

2. One or more computer storage media according to claim 1, wherein reducing the test path comprises selecting two nodes on the test path and finding a minimal path through the model between the two nodes.

3. One or more computer storage media according to claim 1, the process further comprising repeating the reducing, causing, and determining until a threshold for reducing the test path is reached.

4. One or more computer storage media according to claim 1, the executing the program according to the reduced test is performed by a program driver that drives the program according to the reduced test case received thereby.

5. One or more computer storage media according to claim 1, wherein the program condition comprises an error state and the initial test path and the reduced test path both produce the error state in the program.

6. One or more computer storage media according to claim 1, wherein reducing the test path includes communicating with any of different implementations of the interface that are able to read different respective formats of program models to provide the reduction component with working models of programs and are able to use respective different formats of test cases, and using the working models to reduce the test cases while preserving conditions that the unreduced test cases give rise to in the respective programs under test.

7. One or more computer storage media according to claim 6, wherein reducing the test path includes reducing the test cases by replacing a subpath of the test case through the working model with a minimized subpath through the working model.

8. One or more computer storage media according to claim 7, wherein reducing the test path includes applying the test case with the minimized subpath to the corresponding program.

9. One or more computer storage media according to claim 8, wherein reducing the test path includes receiving an indication of whether the test case with the minimized subpath preserved the condition in the corresponding program.

10. One or more computer storage media according to claim 6, wherein reducing the test path includes reducing test cases with incompatible formats.

11. One or more computer storage media according to claim 6, wherein the different implementations drive their respective programs using test drivers specific thereto.

12. One or more computer storage media according to claim 6, wherein in response to a request to reduce a test case, a client invokes a reduction component and the reduction component invokes the implementation that corresponds to the test case requested to be reduced.

* * * * *